No. 710,514. Patented Oct. 7, 1902.
G. RIEXINGER.
FLEXIBLE PIPING FOR THE AIR, STEAM, OR OTHER PIPING FOR RAILWAY CARS.
(Application filed Apr. 25, 1902.)
(No Model.)
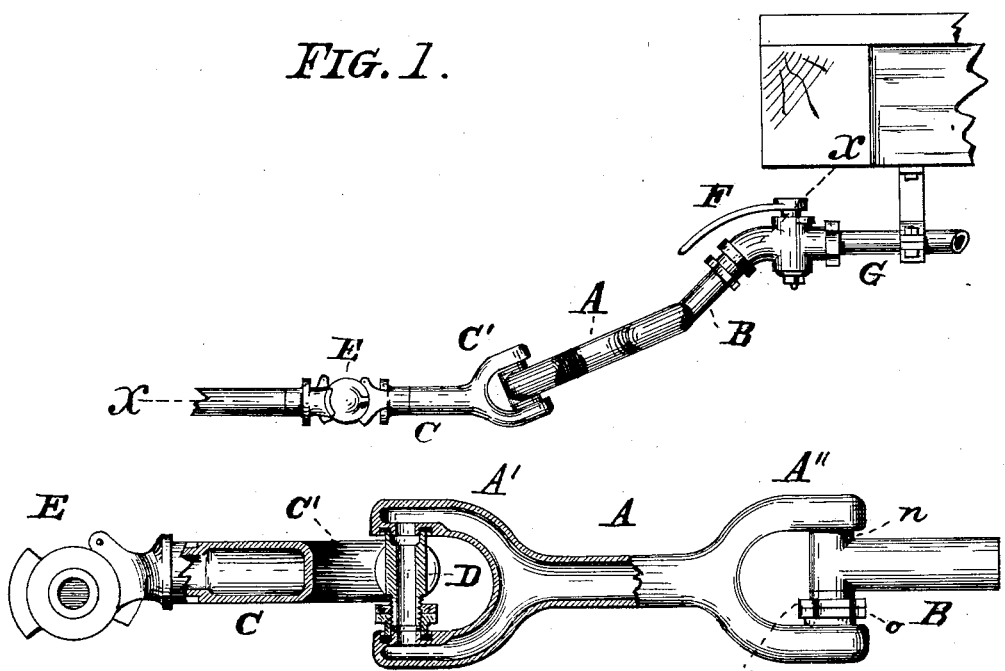
FIG. 1.
FIG. 2.
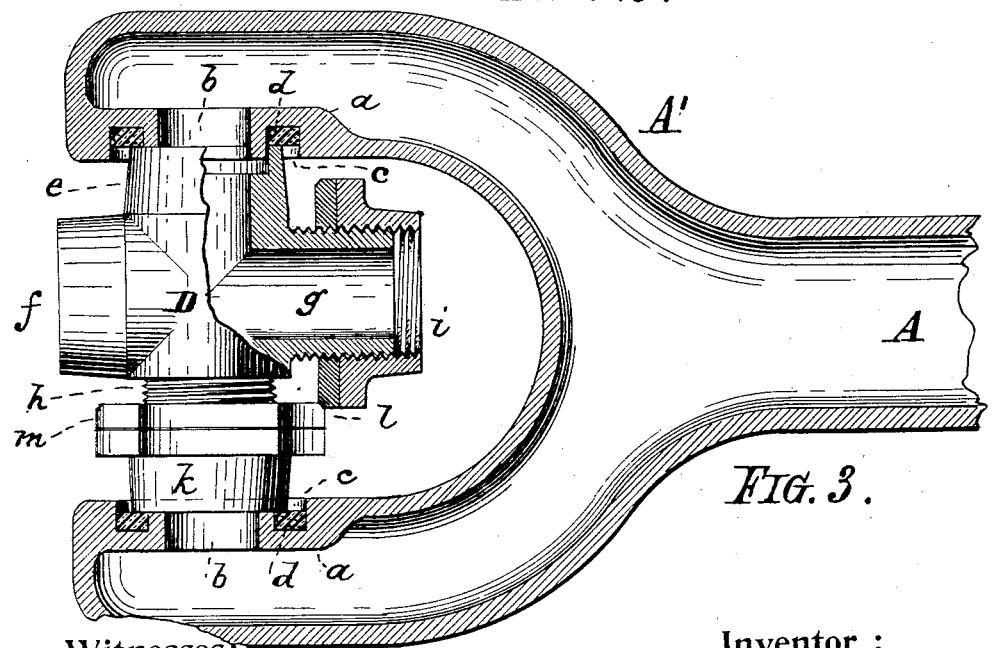
FIG. 3.
Witnesses:
W. E. Dearbaugh.
Thos. W. E. Dearbaugh.
Inventor:
George Riexinger,
By Michael J. Stark & Sons,
Attorneys.

UNITED STATES PATENT OFFICE.

GEORGE RIEXINGER, OF BUFFALO, NEW YORK.

FLEXIBLE PIPING FOR THE AIR, STEAM, OR OTHER PIPING FOR RAILWAY-CARS.

SPECIFICATION forming part of Letters Patent No. 710,514, dated October 7, 1902.

Application filed April 25, 1902. Serial No. 104,647. (No model.)

*To all whom it may concern:*

Be it known that I, GEORGE RIEXINGER, a citizen of the United States, and a resident of Buffalo, in the county of Erie and State of New York, have invented certain new and useful Improvements in Flexible Piping for the Air, Steam, or other Pipes of Railway-Cars; and I do hereby declare that the following description of my said invention, taken in connection with the accompanying sheet of drawings, forms a full, clear, and exact specification, which will enable others skilled in the art to which it appertains to make and use the same.

This invention has general reference to improvements in flexible piping for connecting the steam, air, and other pipes of railway-cars; and it consists, essentially, in the novel and peculiar combination of parts and details of construction, as hereinafter first fully set forth and described and then pointed out in the claims.

In the drawings already referred to, which serve to illustrate this invention more fully, Figure 1 is an elevation of my improved flexible piping and a fragment of a railway-car. Fig. 2 is a plan, partly in section, in line $x\ x$ of Fig. 1. Fig. 3 is a similar view, on a larger scale, of one member of the flexible piping and the cross connection engaged therewith.

Like parts are designated by similar symbols of reference in all the figures.

The object of this invention is the production of a metallic flexible piping to connect the steam, air, and other pipes of two adjacent railway-cars which shall be a perfect substitute for the rubber tubing now almost universally employed for this purpose. To attain this result, I construct this flexible piping of a series of members connected together in a peculiar manner, as will now be fully explained.

A in the drawings represents the main member of this flexible piping. It is a pipe of suitable diameter and length, the ends of which are bifurcated at A' A", the latter fork connecting with a T-shaped member B, while the former connects with the auxiliary member C through the interposition of a cross-piece D. One end of this auxiliary member is bifurcated at C' to engage the respective branches of the cross-piece D. To the opposite end of this member is secured one of the two slip-joint connections E, now generally employed in railway-cars to connect the steam, air, and other pipes of two adjacent cars by means of rubber hose, as already mentioned.

In the inner walls $a$ of the forks of both the main and the auxiliary pipes there are passages $b$ for the air, steam, or other media passing through these members. These holes are surrounded by annular recesses $c$, fitted with packing-rings $d$, upon which bear the faces of the branches of the cross-piece D, as will hereinafter more fully appear. The cross-piece D has two slightly-tapering branches $e\ f$ and two externally-screw-threaded branches $g\ h$, the latter being provided with internally-screw-threaded sleeves $i\ k$ and lock-nuts $l\ m$, as clearly illustrated in Fig. 3, the branch $e$ and sleeve $k$ connecting with the fork A' and the branch $f$ and sleeve $k$ connecting with the fork C' of the auxiliary member C. The T-shaped member has its branch $n$ and its sleeve $o$ and lock-nut $p$, Fig. 2, arranged precisely in the same manner as those of the cross-piece D shown in cross-section in Fig. 3, and the manipulation of connecting it with, and disconnecting it from the fork A" are identical with those of the cross-piece D, which will now be described.

In their normal condition the parts A, B, C, D, and E occupy the position shown in Fig. 1. To remove the auxiliary pipe C from the main pipe A, the lock-nut $l$ and the sleeve $i$ are screwed upon the branch $g$ until the former reaches the branches $e\ k$, thereby shortening the extreme length of the branches sufficiently to allow them to be passed out of the fork. To replace the cross-piece D, it is placed into proper position between the fork and then the sleeve unscrewed until its face and the face of the opposite tapering branch bear snugly upon the packing-rings, thereby securing a tight joint, after which the lock-nut is screwed down upon the sleeve to prevent the latter from turning. It will now be observed that when the T-shaped member B has been affixed to the usual stop-cock F in the air or steam pipe G the main pipe A may swing in a vertical plane almost an entire revolution, while the auxiliary pipe C may swing in the fork of the main pipe in every direction, so that the ends of the piping on two opposite cars may be connected together by the slip-joint connections in the same manner as is now done with the rubber tubes.

The parts of this piping may be made of malleable metal—such as malleable iron, steel casting, brass, &c.—malleable iron being perhaps the most suitable for obvious reasons. They require but little fitting or machining and can be produced sufficiently cheap to become a perfect substitute for the rubber hose now employed, which is a large item in the cost of repairs of railway-cars, owing to their very limited durability and short serviceable condition. The packing-rings may be of rubber, leather, (when not subjected to heat,) composition metal, soft metal, or any other suitable substance, and the bearings may be ground to a fit, as may be found most desirable in each case.

Having thus fully described this invention, I claim as new and desire to secure to me by Letters Patent of the United States—

1. In railway-cars, a metallic, flexible, connecting-piping consisting, essentially, of a T-shaped member attached to the stop-cock of the air and other pipes, a sleeve and lock-nut on the T end of this pipe, a main member having two forks as described, a cross-piece in one of these forks, an auxiliary pipe having a fork connected with said cross-piece, and a slip-joint member attached to said auxiliary member, as stated.

2. In a metallic flexible piping, consisting of a series of members having forked ends and passages in the inner walls of the forks, of a cross-piece having two plain branches and two externally-screw-threaded branches, sleeves upon the said screw-threaded branches and having their external contour corresponding with that of the remaining branches and lock-nuts behind the sleeves, as and for the object set forth.

In testimony that I claim the foregoing as my invention I have hereunto set my hand in the presence of two subscribing witnesses.

GEORGE RIEXINGER.

Attest:
F. J. FRANKENBERGER,
SAMUEL J. RAMSPERGER.